May 25, 1937. C. G. MILLER 2,081,551
ELECTROPROCESSING MACHINE
Filed Oct. 25, 1934 16 Sheets-Sheet 1

May 25, 1937.  C. G. MILLER  2,081,551
ELECTROPROCESSING MACHINE
Filed Oct. 25, 1934  16 Sheets-Sheet 3

CONSTANTINE G. MILLER, Inventor

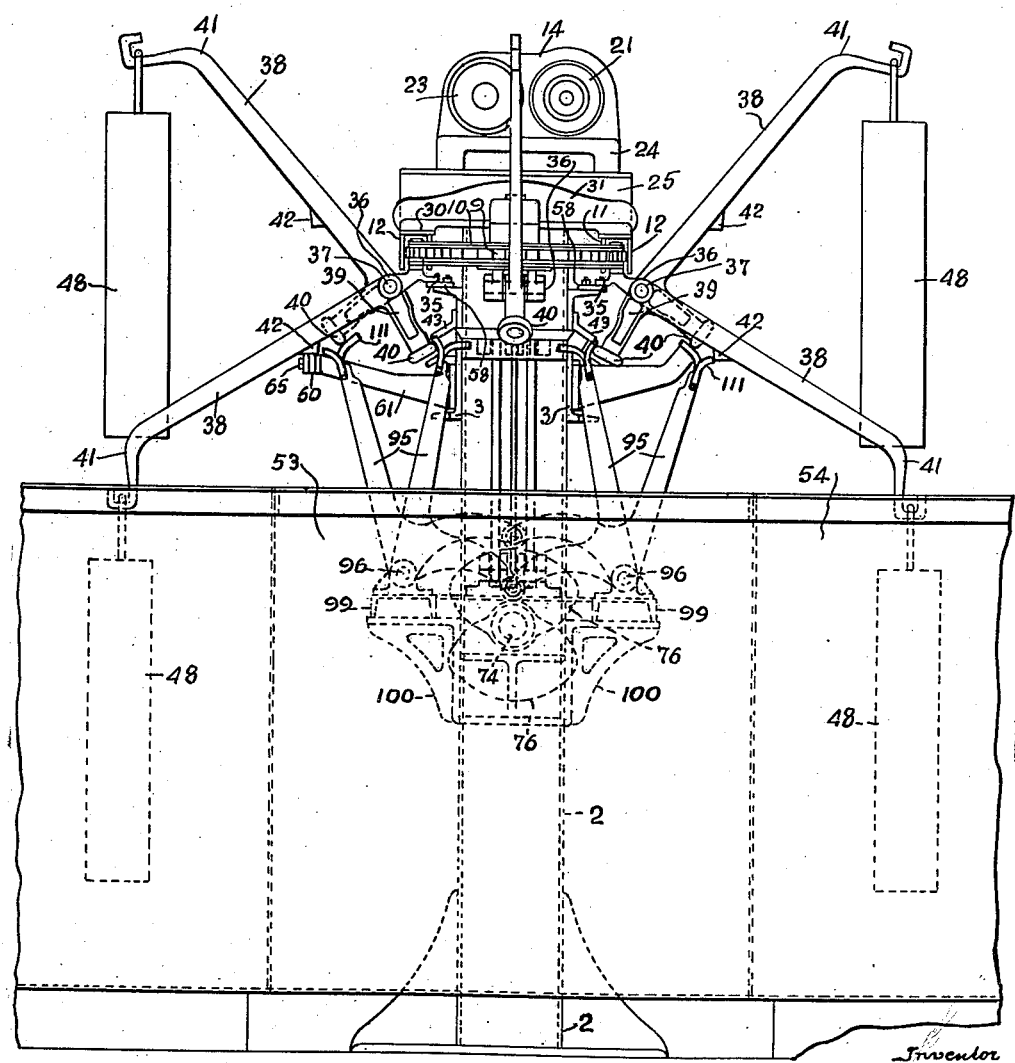

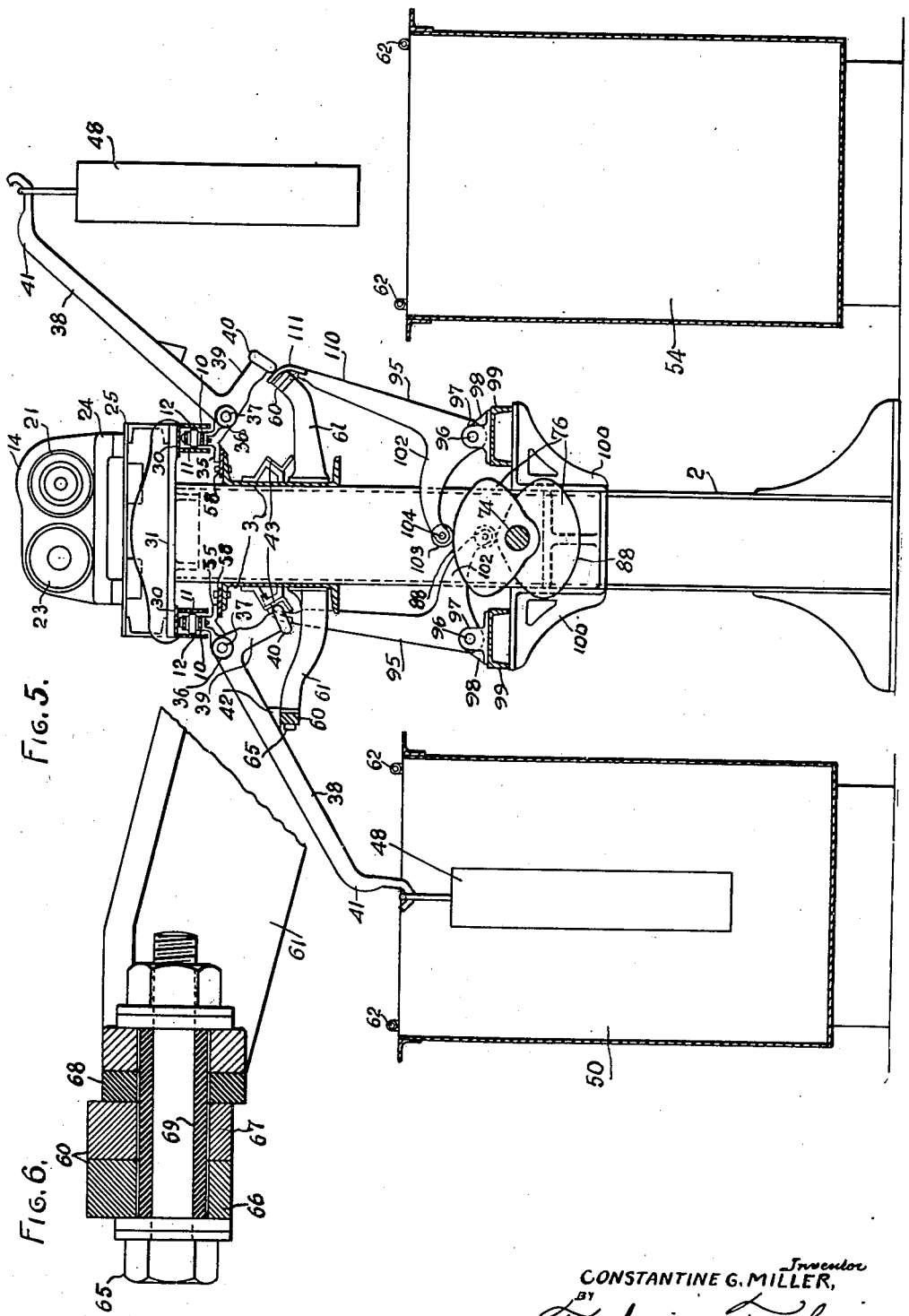

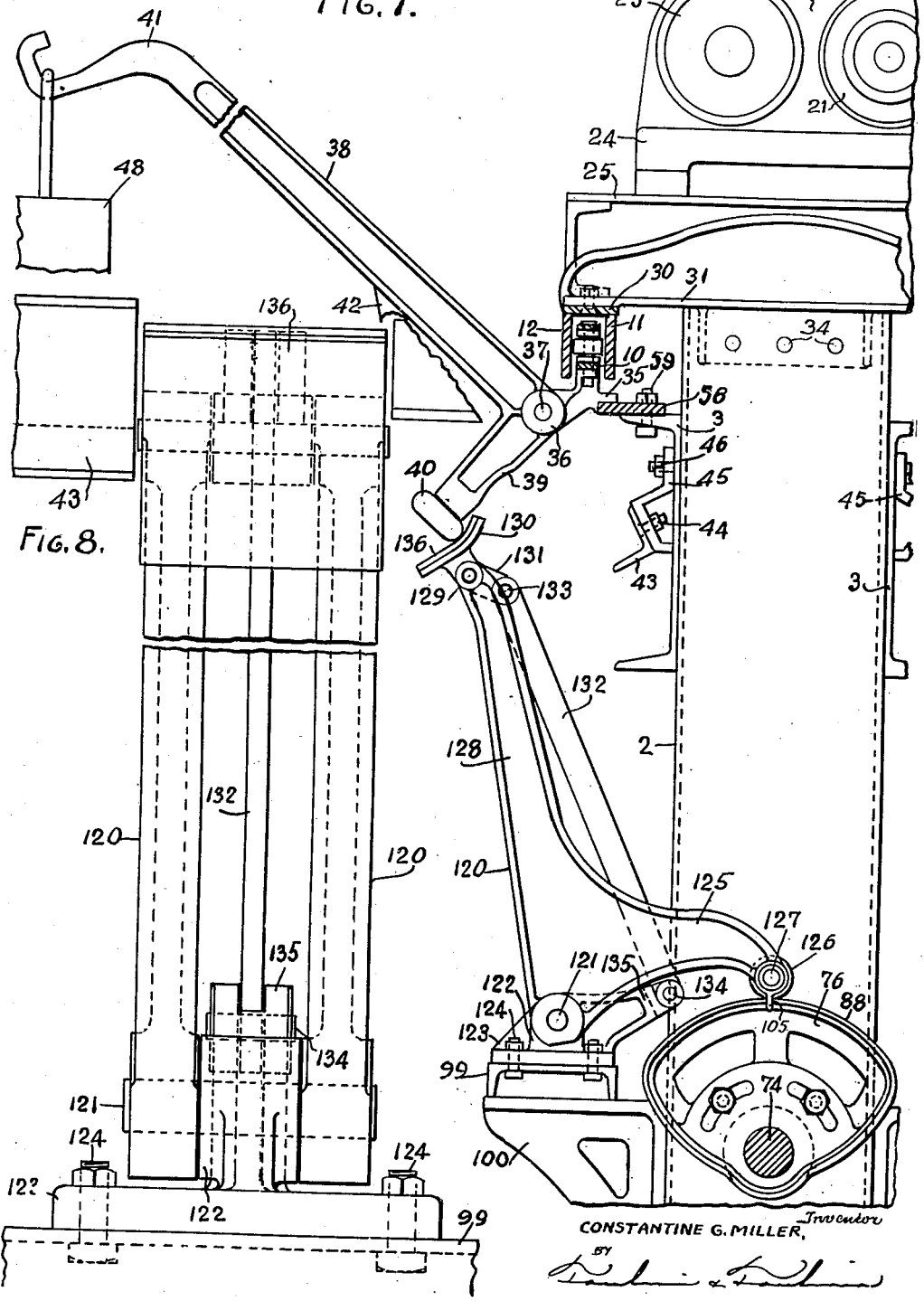

May 25, 1937.  C. G. MILLER  2,081,551
ELECTROPROCESSING MACHINE
Filed Oct. 25, 1934   16 Sheets-Sheet 7
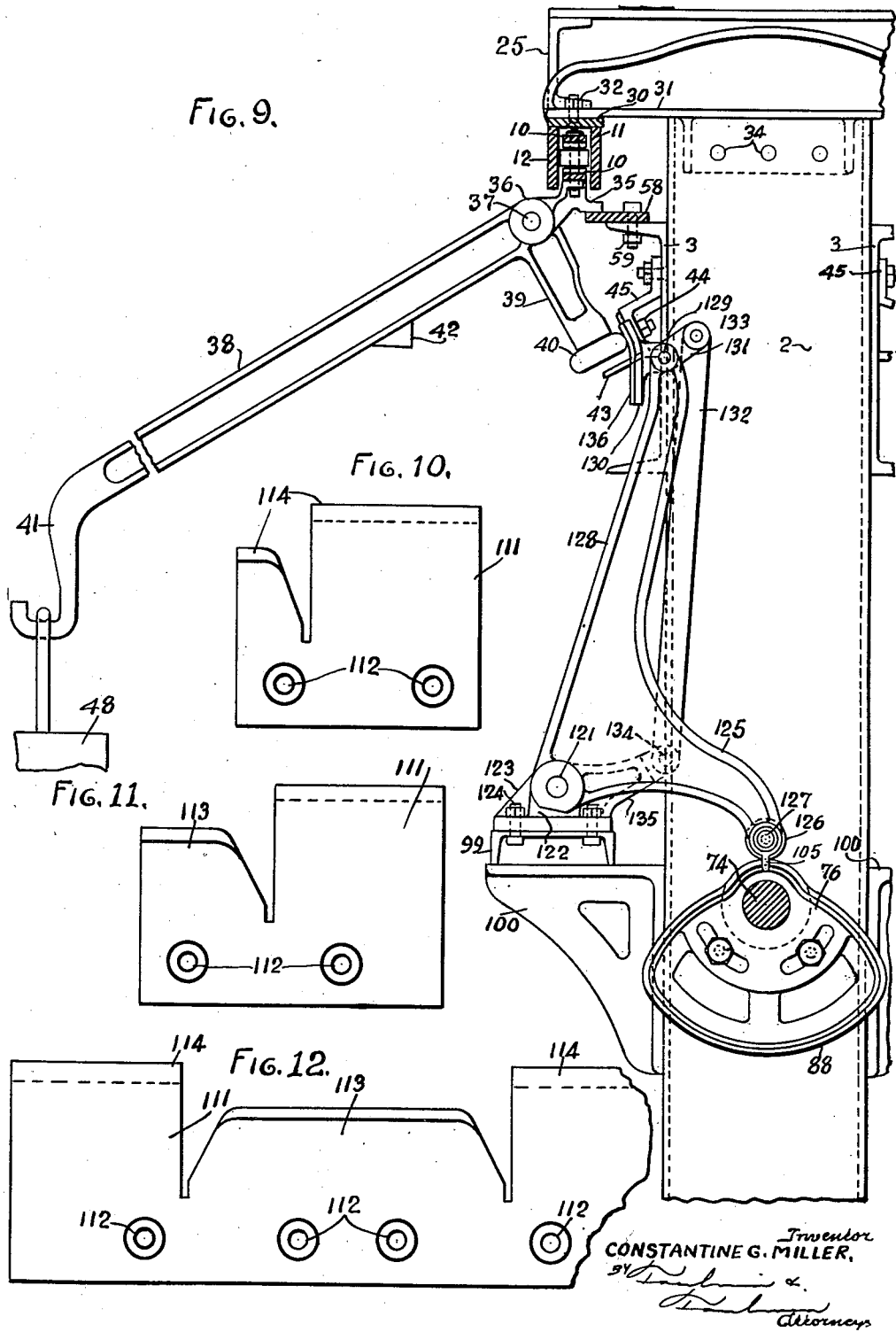

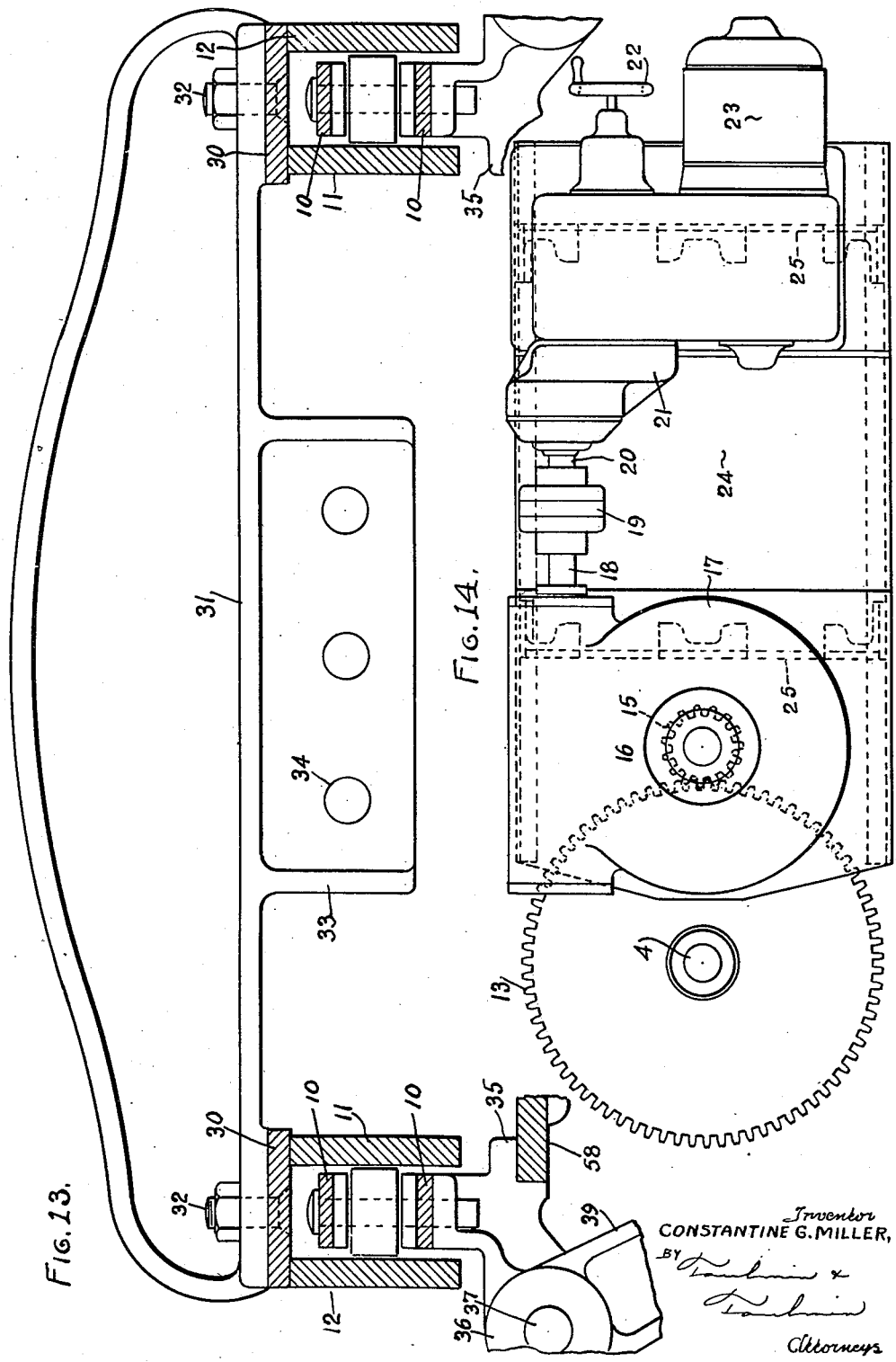

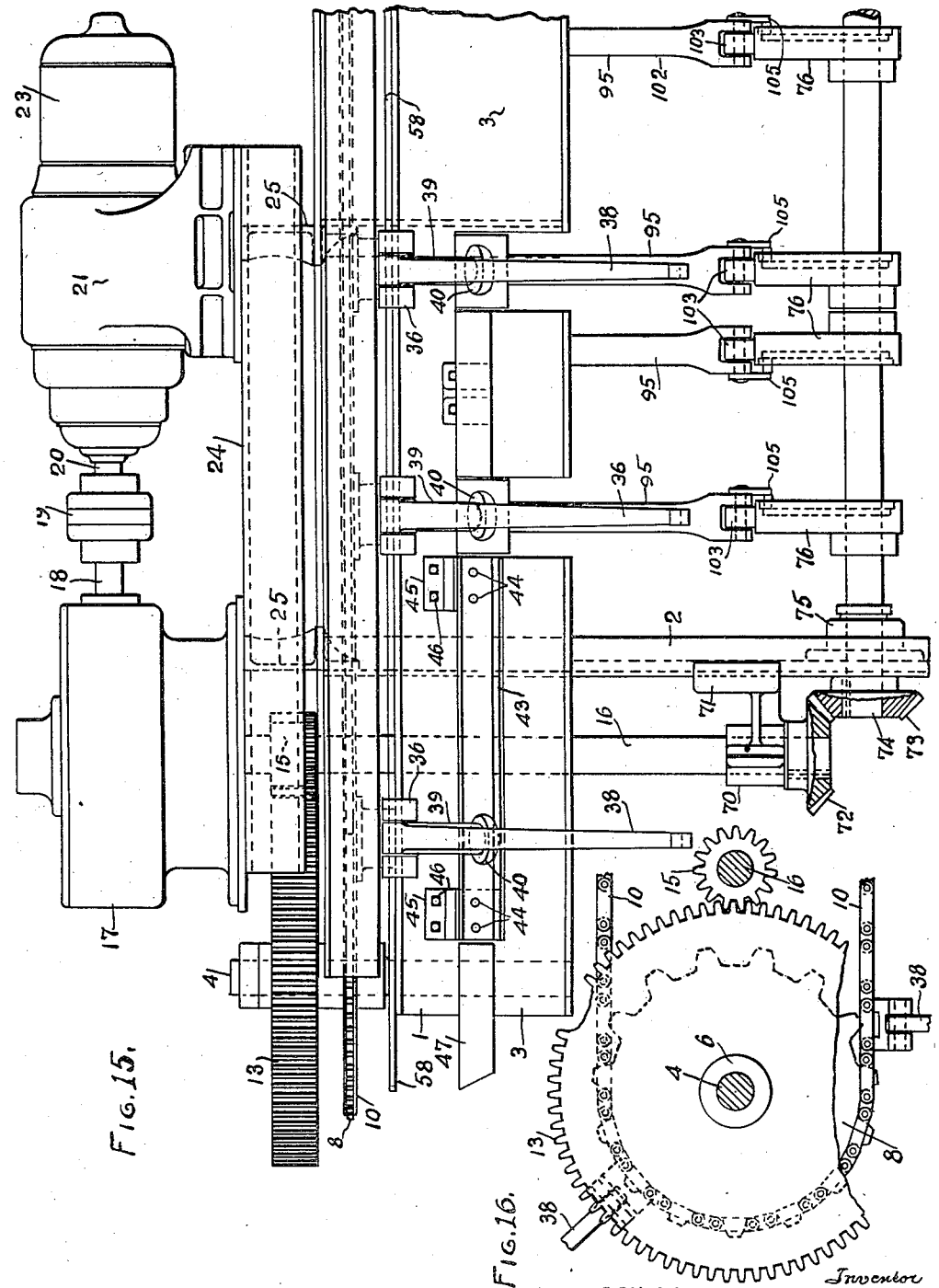

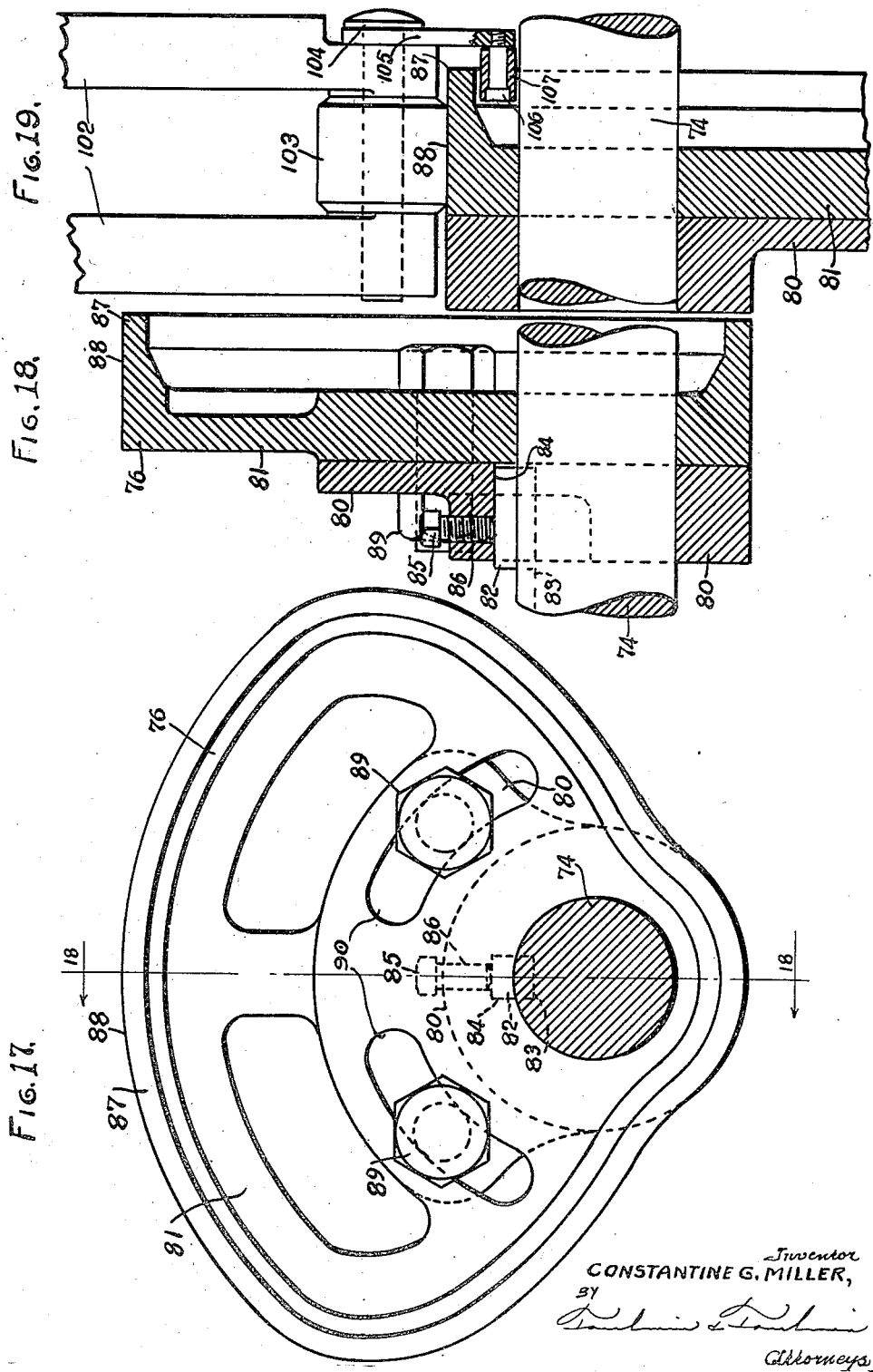

May 25, 1937.　　　　C. G. MILLER　　　　2,081,551
ELECTROPROCESSING MACHINE
Filed Oct. 25, 1934　　16 Sheets-Sheet 11
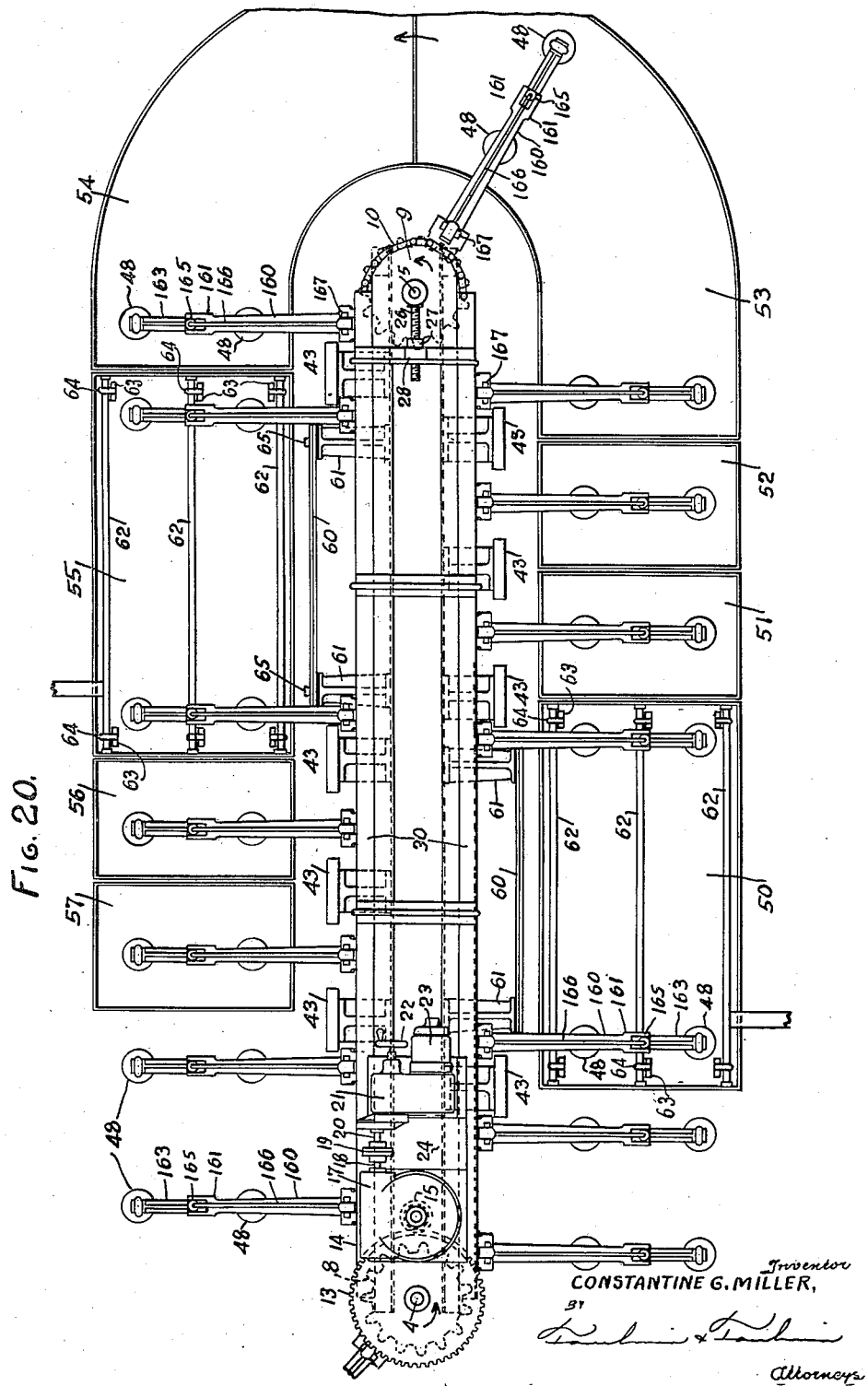
CONSTANTINE G. MILLER,
Inventor

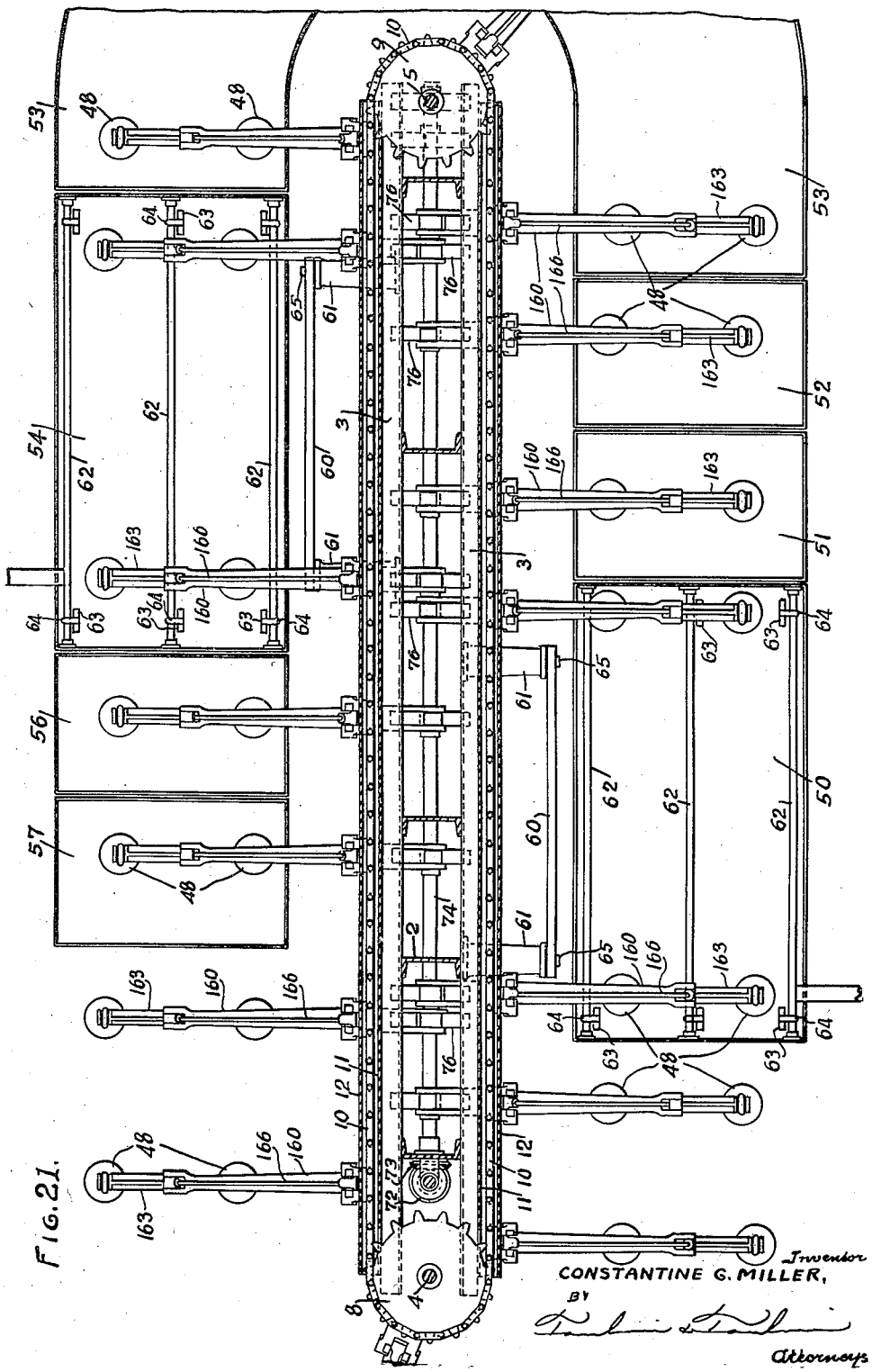

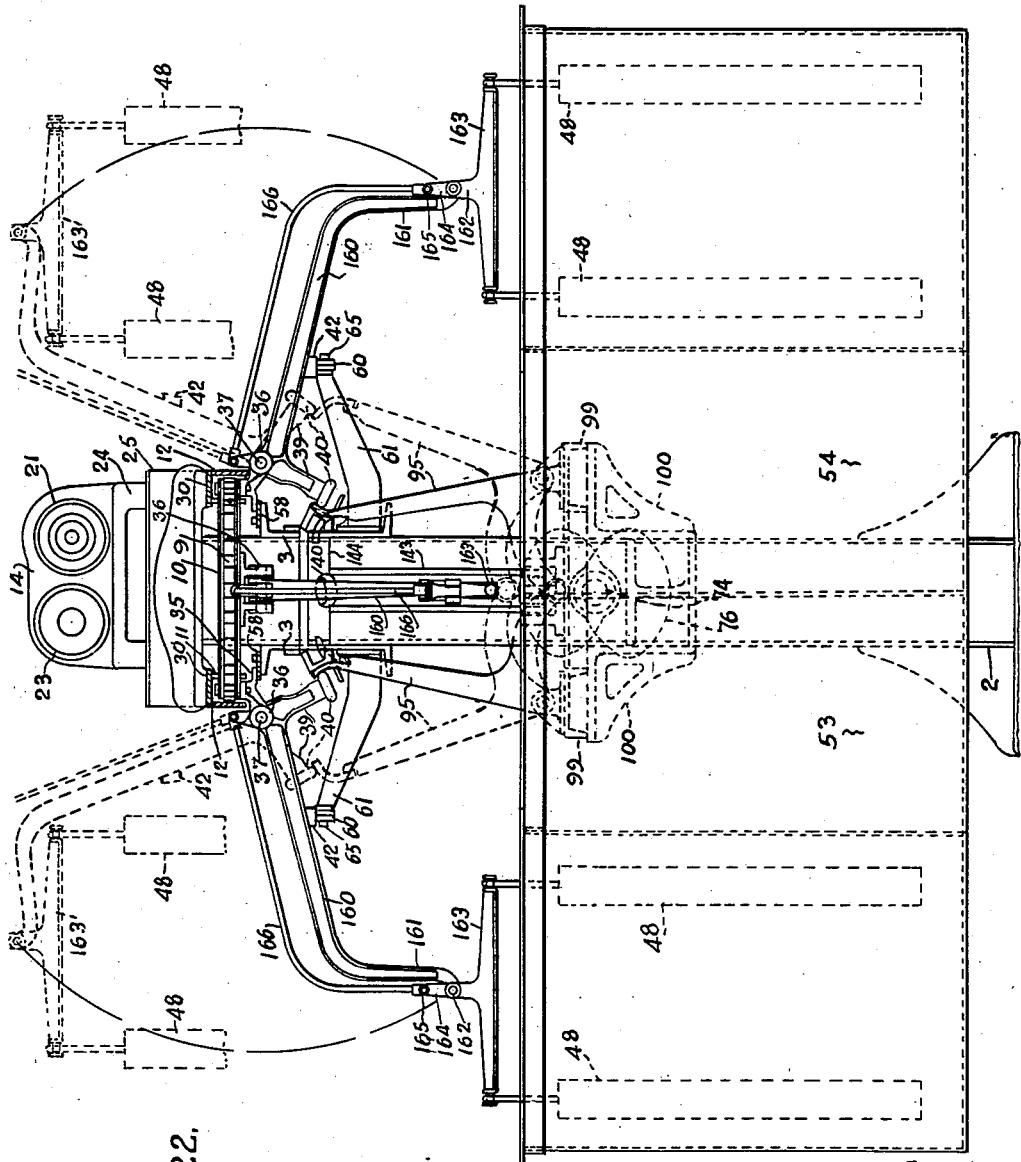

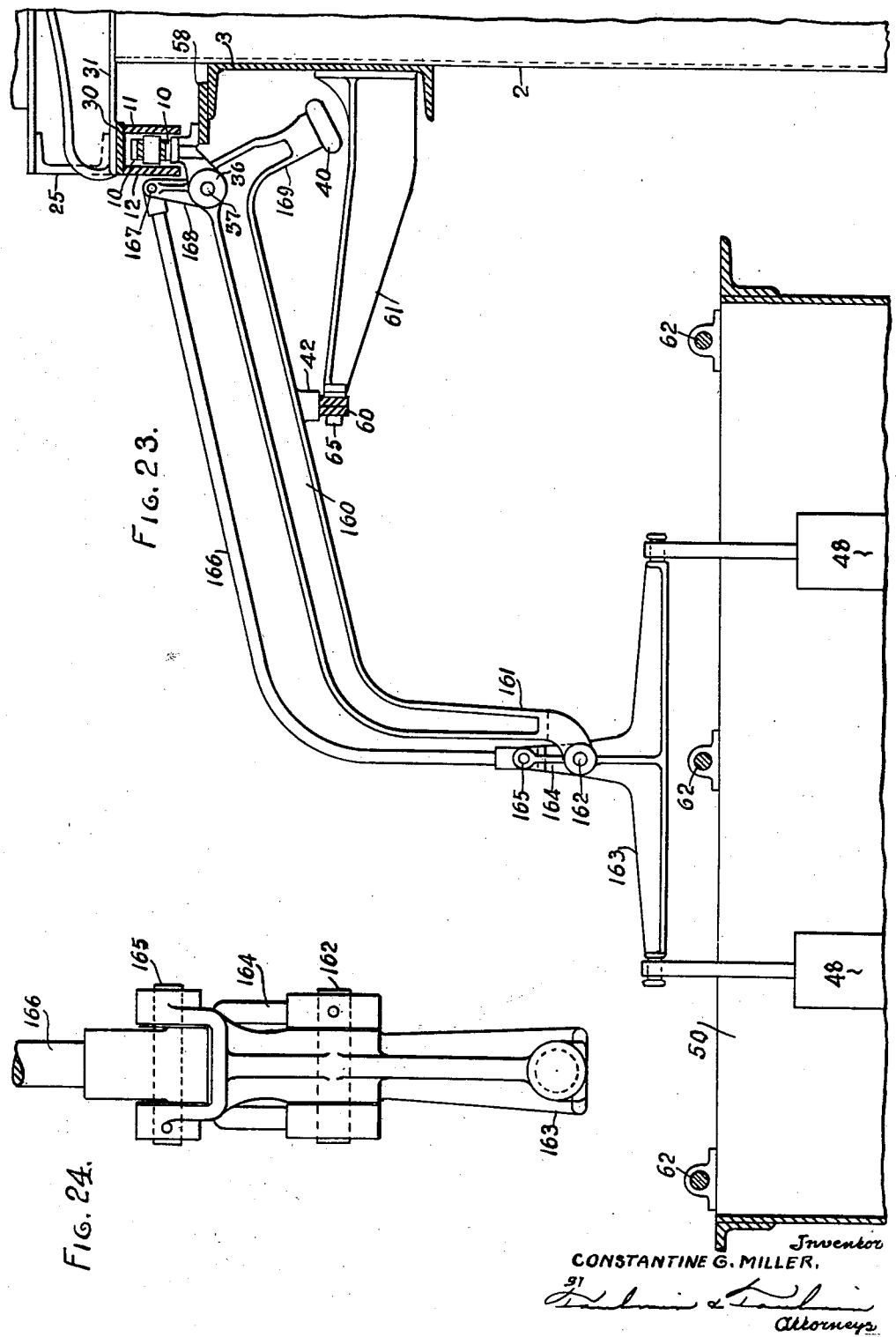

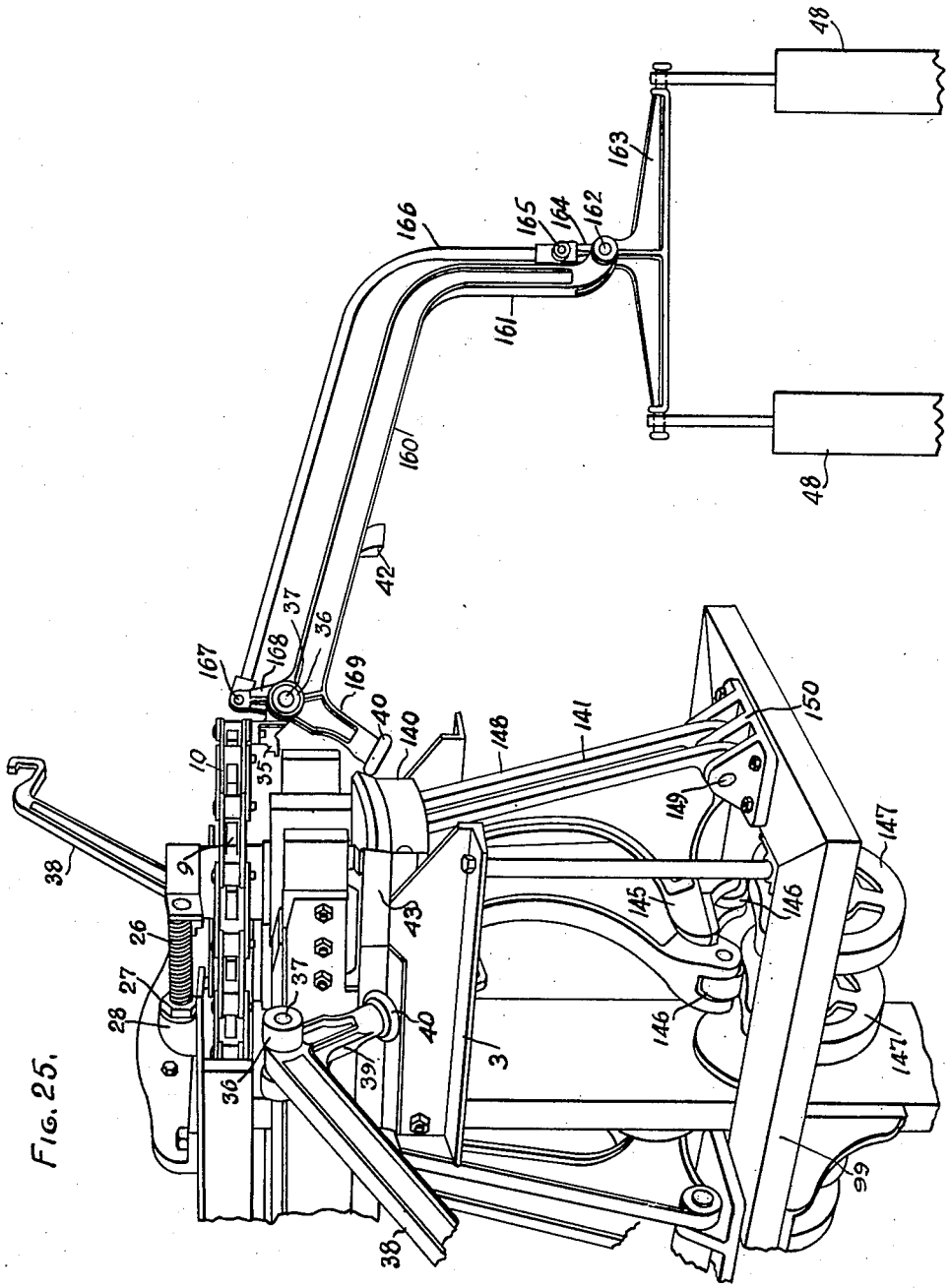

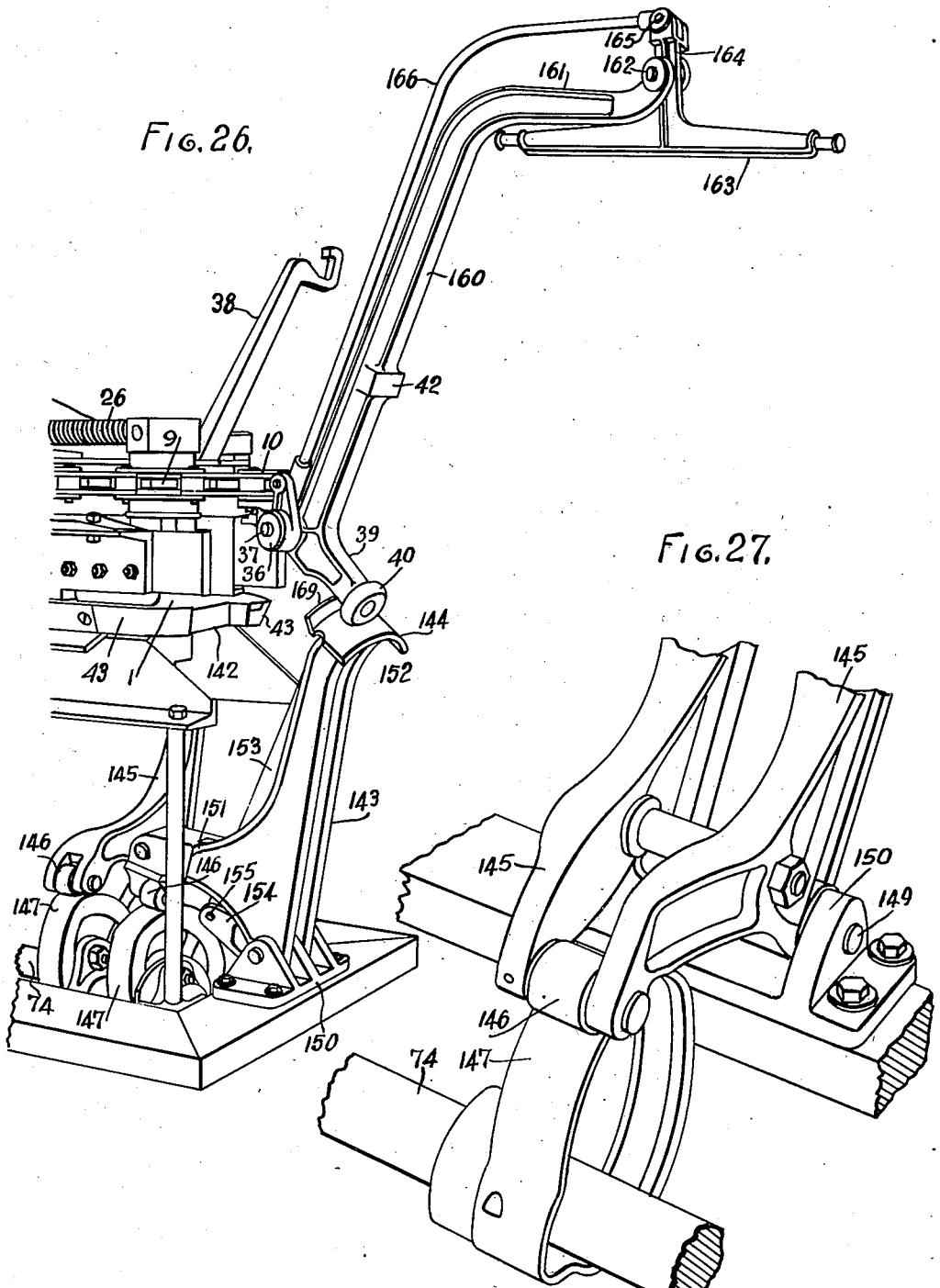

Patented May 25, 1937

2,081,551

UNITED STATES PATENT OFFICE 2,081,551

ELECTROPROCESSING MACHINE

Constantine G. Miller, Chicago, Ill., assignor to The Meaker Company, Chicago, Ill., a corporation of Illinois Application October 25, 1934, Serial No. 749,946

11 Claims. (Cl. 204—5)

This invention relates to electroprocessing machines and, in particular, to such machines wherein the work pieces travel during processing and are transferred from tank to tank by appropriate mechanism.

One object of my invention is to provide an electroprocessing machine having traveling work carriers, and including moving means positively engaging these work carriers for transferring the work pieces over the partitions between the processing tanks.

Another object is to provide an electroprocessing machine of the traveling type wherein the work carriers are positively engaged by moving mechanism adapted to raise the carrier arms over the tank partitions as the carrier arms pass around the end of the machine.

Another object is to provide such a machine wherein the carrier arms are provided with means for holding a pair of work pieces, this holder being adapted to maintain the work pieces in a given direction during the raising and lowering operations.

Another object is to provide an electroprocessing machine of the traveling type wherein the work carrier is moved by appropriate means, and transferred from tank to tank by a moving member which positively engages a portion of the carrier, the contacting portions being adapted to maintain favorable angles of contact with one another regardless of whether the carrier arm is raised or lowered.

Another object is to provide an electroprocessing machine of the type having carrier arms which move in an orbital path, these carrier arms being engaged at intervals by transfer members operating in timed relationship with the remainder of the mechanism in such a manner as to lift the carrier arm and the work pieces over the partitions between the tanks when the carrier arm arrives at such points, the transfer member having a contact portion of such configuration as to engage a portion of the carrier arm in such a manner as to allow the carrier arm to have the utmost freedom of motion without binding or oblique forces interfering with its progress.

Another object is to provide a transfer mechanism for an electroprocessing machine wherein the carrier arms are moved in an orbital path and raised or lowered by movable transfer members operated in timed relationship therewith, the transfer members having contact plates or shoes which are movably operated in such a manner that they offer the contact plates at the most suitable angle to the follower portion of the carrier arm regardless of the position thereof whether lowered or raised.

Another object is to provide an end transfer mechanism for an electroprocessing machine having toggle means for accelerating the speed of transferring the work pieces over partitions between end tanks, thereby economizing on the length of machine required, as well as shortening the time required for such transfer operations.

Another object is to provide an adjustable cam mechanism for operating the transfer members in adjustably timed relationship with the carrier arms.

In the drawings:

Figure 4 is an end elevation similar to Figure 3, but at the opposite end thereof and looking in the opposite direction;

Figure 5 is a sectional view through the machine shown in Figure 1, taken along the line 5—5 thereof;

Figure 6 is an enlarged detail view of the cathode bar with its mounting and insulation, as shown in Figure 5;

Figure 7 is an enlarged side elevation, partly in section, of a portion of the machine of Figure 1, showing a modified form of transfer member engaging the carrier arm and moving it into a raised position;

Figure 8 is a front elevation of a portion of the transfer mechanism shown in Figure 7;

Figure 9 is a side elevation similar to Figure 7, but showing the carrier arm in its lowered position;

Figure 10 is an enlarged detail view of a contact plate of the transfer member;

Figure 11 is a modified view of a contact plate similar to that in Figure 10;

Figure 12 is a view of a modified form of a contact plate of a double type;

Figure 13 is an enlarged cross section along the line 13—13 of Figure 1, showing the conveyor chain, its guard rails and adjacent mechanism;

Figure 14 is a plan view of the driving unit for the machine of my invention;

event that it is not desired to raise and lower the work carriers 38 at these ends, the machine is provided with end guide rails 47 (Figures 1 and 15), these being mounted upon the frame side members 3.

Figure 2:
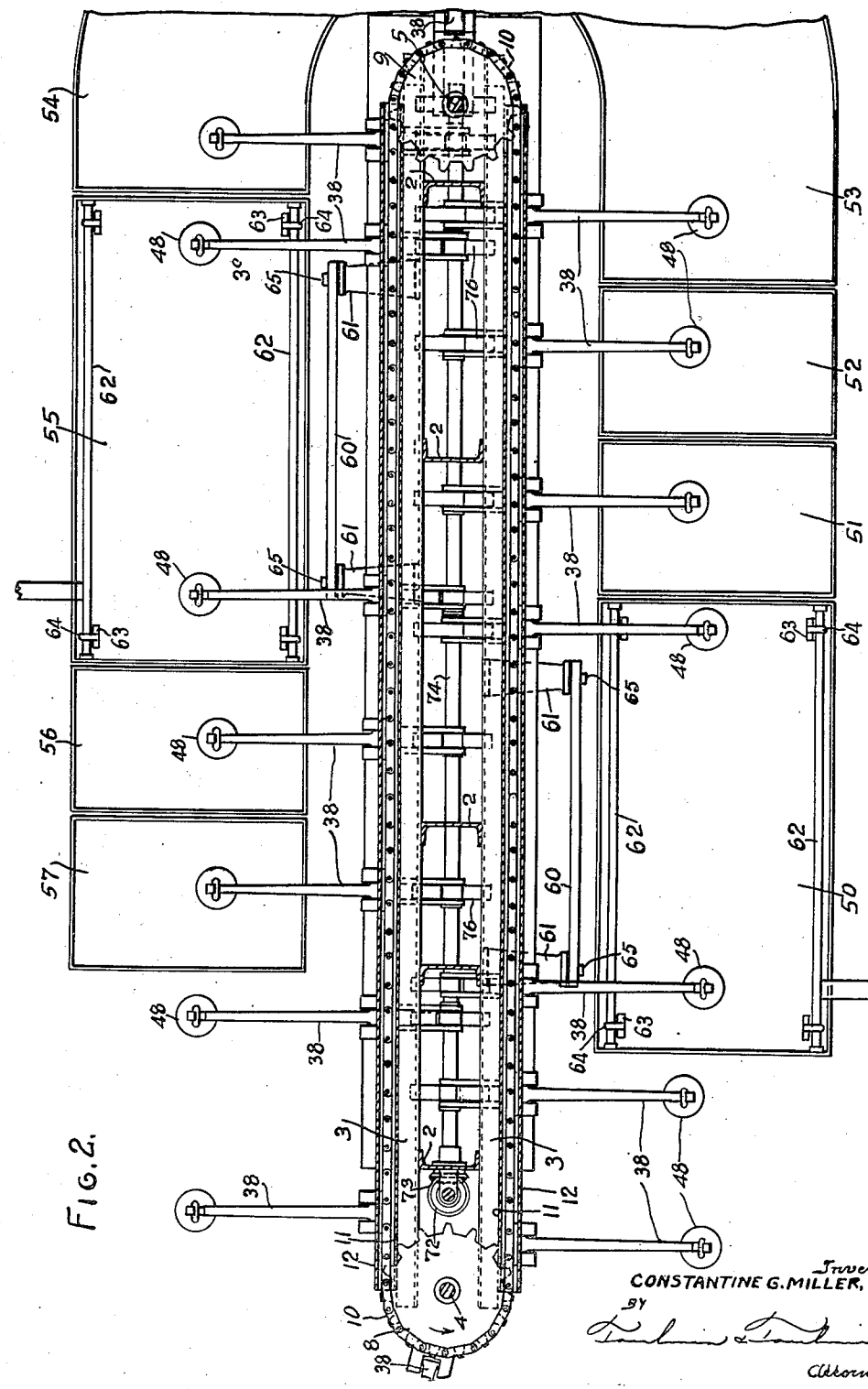
Figure 2 is a plan view, partly in section, of the machine shown in Figure 1, with the driving unit and cover plate removed to show the underlying mechanism more clearly.

Arranged around the machine are tanks 50, 51, 52, 53, 54, 55, 56 and 57. These tanks contain the various solutions employed in the particular electroprocessing operations which are to be carried out by the machine. It is to be understood, of course, that the number of tanks may be increased or decreased as desirable or necessary for the particular process being employed. In the arrangement shown as an example, the tanks 50 and 55 employ electrical current in their utilization. The negative current, for example, is supplied by the cathode bars 60 (Figure 2) supported upon the brackets 61 attached to the frame 1. The cathode bars 60 are connected in any suitable manner to a current source of negative polarity.

The tanks 50 and 55 are also supplied with the anode bars 62 arranged along opposite sides thereof, and connected to a current source of positive polarity. From these anode bars 62 may be suspended anodes of any siutable form and composition, depending upon the particular process it is desired to carry out. These anodes, for example, may consist of metal bars 63 having hooks 64 at their upper ends, by which they may be suspended from the anode bars 62. It will be observed (Figure 5) that when the work carriers 38 are in their lowered positions, as when moving through the tank 50 or 55, the projections 42 thereon will slidably engage the cathode bars 60 and cause the passage of electric current to take place. The cathode bars 60 are secured to their supporting arms 61 by the bolts 65.

The details of the mounting and construction of the cathode bar 60 are shown in Figure 6. The cathode bar 60 consists of a pair of bars 66 and 67 held in abutment with one another by the bolts 65, securing them to the frame brackets 61. The cathode bar portions 66 and 67 are insulated, however, from the bolts 65 by the insulating sleeves 69 and from the brackets 61 by the insulating spacers 68. In this manner the cathode bar 60 is firmly supported upon the brackets 61, yet electrically insulated therefrom.

Figure 3:
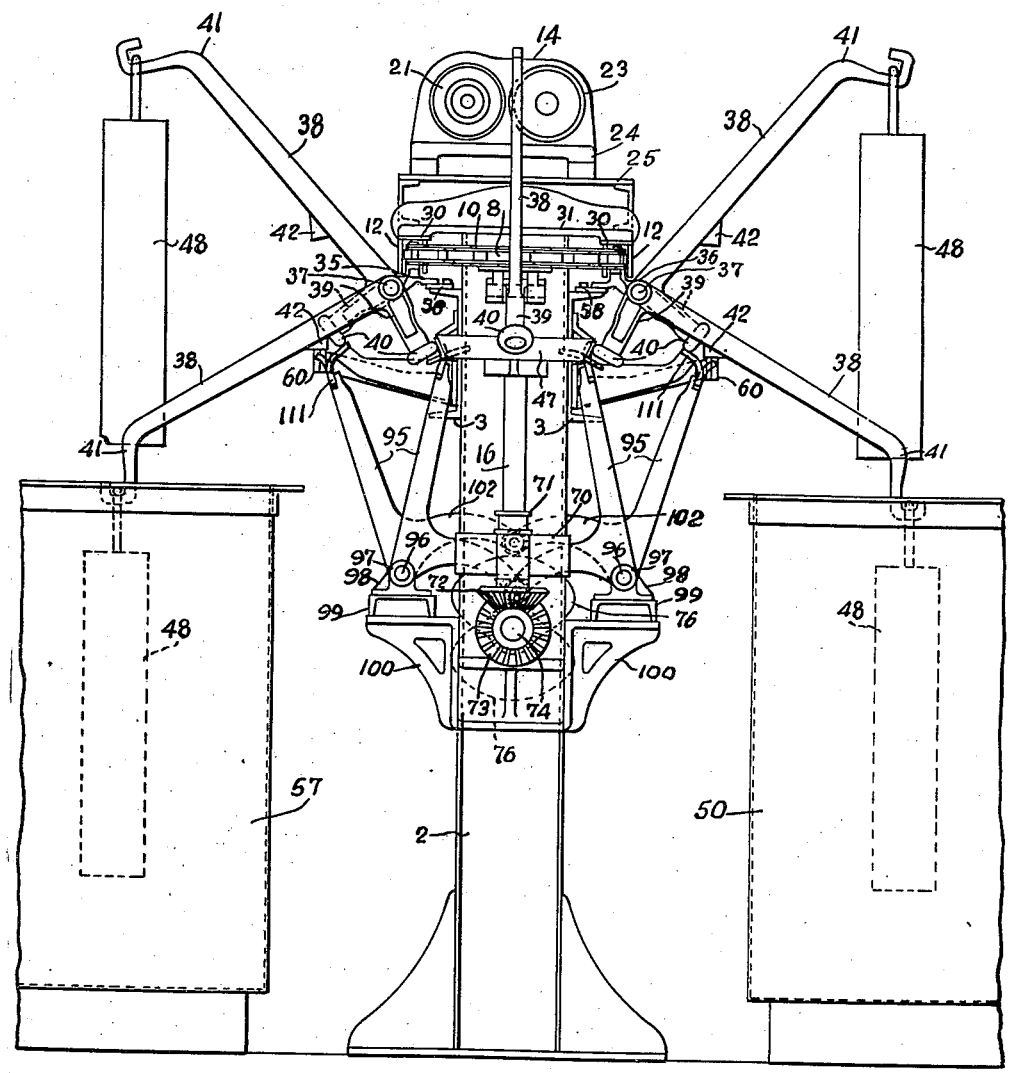
Figure 3 is an end elevation of the machine, shown in Figure 1, at the loading end thereof.

The transfer mechanism whereby the work carriers 38 are raised and lowered as they pass the partitions between the successive tanks is shown in Figures 3, 4 and 15 for the so-called "rigid" type of transfer member; and in Figures 7 and 9 for the so-called "toggle" type of transfer member. Both types, however, are driven by substantially the same mechanism as shown in Figure 15.

The transfer mechanism receives power from the same vertical shaft 16 (Figure 15), which drives the sprocket gear 13 by way of the pinion 15. The lower end of the shaft 16 is journaled in the bearing 70 mounted upon the bearing hanger 71 secured to the vertical frame member 2. Mounted upon the lower end of the shaft 16 is a bevel gear 72 which meshes with a bevel gear 73 mounted upon the horizontal shaft 74 which is arranged in a longitudinal direction through the machine. The shaft 74 is journaled in the bearing portions 75 mounted upon the various portions of the frame 1, and is provided at intervals with cams, generally designated 76 and hereinafter described in detail. The cams 76 in turn are engaged by the transfer mechanism and this in turn raises and lowers the work carriers 38 in response to the action of the cams 76, as driven by the shafts 16 and 74.

The cams 76 (Figures 15, 17, 18 and 19) are adjustable by reason of their construction, so as to enable the transfer mechanism which they drive to be accurately synchronized with the motion of the conveyor chain 10, this adjustment being effected by a quick and simple means which may be adjusted without disturbing the mounting of the cam 76 itself upon the shaft 74. To this end, the cam 76 consists of two main parts, namely, the cam hub 80 and the cam portion proper 81. The cam hub 80 is keyed to the shaft 74 through the intermediate action of the key 82 engaging the key-way 83 in the shaft 74, and likewise engaging the key-way 84 in the cam hub 80. The key 82 is held in its proper position by means of the set screw 85 which passes through the threaded bore 86 in the cam hub 80.

The cam portion 81 consists of an irregularly-shaped body having a peripheral rim 87 with an outer contact surface 88. The configuration of the rim 87 and contact surface 88 may be of any suitable form according to the motion it is desired to give to the transfer members. The cam portions 81 are loosely mounted upon the shaft 74, and held in engagement with the cam hubs 80 by means of the bolts 89 passing through the arcuately-slotted portions 90 of the former and through the bores 91 of the latter. Thus it will be evident from Figures 17 to 19 inclusive that the timing effect of the cam 76 may be altered by loosening the bolts 89 and rotating the cam portion 81 relatively to the cam hub 80. The bolts 89 may then be tightened when the desired point has been reached. In this manner, slight changes in the timing may be brought about without disturbing the general setting of the mechanism.

Figure 1:
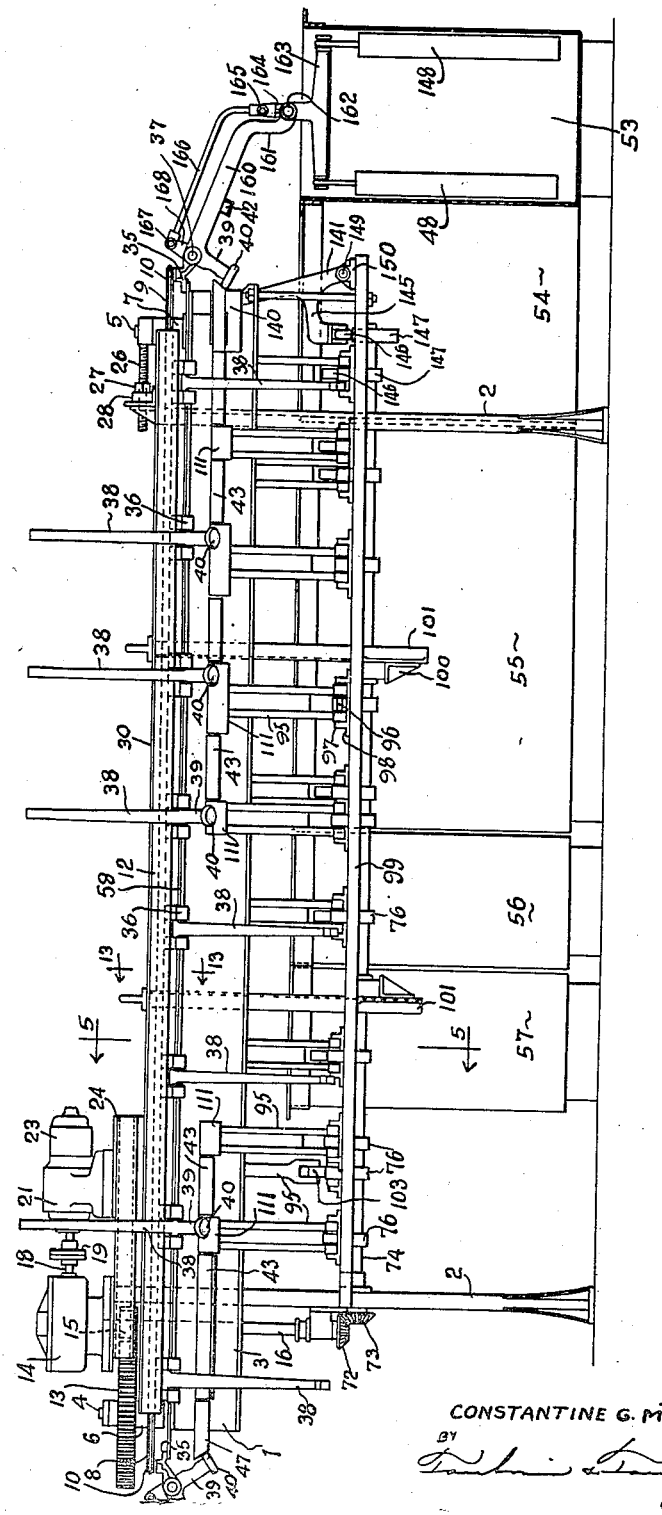
Figure 1 is a side elevation of the electroprocessing machine of my invention with a part of the tanks removed to show the mechanism more clearly, and employing a single work holder.

The transfer mechanism operated by the cams 76 consists, in its "rigid" type, of a transfer member, generally designated 95, and of approximately bell-crank form (Figures 1, 3, 4 and 5). The transfer members 95 are pivotally supported upon the shafts 96, these in turn being mounted in the yoke portions 97 of the brackets 98 resting upon the longitudinal frame members 99 (Figures 1, 3 and 5). The frame brackets 100 mounted upon the vertical frame members 101 serve to support the horizontal frame members 99.

The transfer member 95 consists of bell-crank portions (Figures 1 and 15), the lower arms 102 of which carry rollers 103 at the outer ends thereof, these rollers being rotatably mounted upon the pins 104 passing therethrough. The rollers 103 serve as cam followers (Figures 5 and 19), and engage the peripheral surface 88 of the cam 76. The pins 104 also carry the links 105, whose opposite ends are provided with the stud screws 106 on which are mounted the retaining rollers 107 engaging the inner surfaces of the cam rim portions 87 (Figure 19). By this construction the rollers 103 are maintained in engagement with the cam surfaces 88 of the cam portions 81.

The upper arms 110 of the transfer members 95 are provided with the contact plates 111 mounted upon their outer ends (Figures 3 to 5, and 10 to 12), as by bolts or screws through the holes 112 therein. These contact plates 111 serve the purpose of engaging the rollers 40 of the work carrier arms 38, so as to raise and lower the latter according to the motion imparted by the cams 76. The contact plates 111 may be of any suitable configuration, such as the examples shown in Figures 10 to 12 inclusive. In these examples, the contact plate 111 is shown to have differently bent portions 113 and 114. The purpose of these differently bent portions is to engage the roller 40 at a suitable angle regardless of whether the work carrier arms 38 are in their raised or lowered positions. Consequently, it will be observed that when the cams 76 are rotated by the shaft 74, the upper ends of the transfer members 95 will move in and out, carrying with them the contact plates 111 at their outer ends. The latter will likewise force the rollers 40 to move in or out, thereby causing the upper arms 41 of the work carriers 38 to move up and down over the partitions between the various tanks. The work pieces 48 suspended from the hook-shaped outer ends of the work carriers 38 are thereby submerged in the various solutions and lifted from tank to tank in the desired manner. In the intermediate positions between the contact plates 111 of the transfer members 95, the rollers 40 engage either the guide rails 43 or the end guide members 47; or else they remain out of contact with the apparatus due to the engagement of the projections 42 with the cathode bars 60.

The "toggle" type of transfer mechanism is shown in Figures 7 and 9. In this modification, the contact plates are moved by the means hereinafter described in order to present the most favorable angle to the rollers 40 at every position of the carrier arms 38 between their lowest and highest positions. To this end, the toggle transfer members 120 are of bell-crank form and are in double arrangement (Figure 8), and are pivotally mounted upon the pin extending between them. This pin 121 is supported upon the projecting portion 122 of the bracket 123, which in turn is secured by the bolts 124 to the horizontal frame members 99 mounted upon the frame brackets 100. The lower arm portions 125 carry the contact roller 126 on the pin 127 at their outer ends (Figures 7 and 9). The upper arm portions 128 at their outer ends carry the pin 129 which pivotally supports the contact plate 130. The latter is provided with the lever arm 131 pivotally engaging the link 132 at the pin connection 133. The lower end of the link 132 is pivotally mounted upon the pin 134 supported by the extended portion 135 of the bracket 123. The cam 76 and its adjacent mechanism are of substantially the same construction as previously described, and consequently are designated with the same numerals.

In the operation of the toggle type transfer member 120, the rotation of the cam 76 causes the lower arm portion 125 to rise and fall, imparting an in-and-out motion to the upper arm portion 128 thereof. This in turn causes the contact plate 130 to be carried to and fro, engaging the roller 40 to move the work carrier 38 up and down over the partitions between the various tanks. At the same time, the action of the link 132 upon the lever arm 131 attached to the pivoted contact plate 130 causes the contact surface 136 thereof to be presented to the roller 40 at the most favorable angle, regardless of the relative positions of the parts or of the position of the carrier arm 38, whether raised or lowered.

The employment of the present invention permits transfers to be made at the ends of the machine as well as along the sides thereof, thus enabling the work pieces to be successively submerged in different end tanks. In this manner the overall length of the machine may be substantially reduced and the handling of the work considerably speeded up. This end transfer mechanism of the present invention is shown in detail in Figures 25 and 26. The rigid type of transfer arm is shown, but it will be understood that the toggle type previously described may also be used if desired, this type employing the pivoted contact plate instead of the rigid one.

In the end transfer mechanism, the fixed end guide rail 47 is replaced by the suitably curved end contact plate 140 (Figure 25), this being mounted upon the outer end of the transfer member 141. A suitable recess 142 is provided in the end of the frame 1 and located between the adjacent guide rail sections 43. The transfer member 141 shown in Figure 25 is of the "rigid" type wherein the contact plate 140 is fixedly mounted thereon. In Figure 26, however, the transfer member 143 is of the "toggle" type having its contact plate 144 pivotally mounted thereon.

The rigid transfer member 141 is provided with a lower arm portion 145 carrying a roller 146 which is adapted to engage the cam 147 mounted upon the same shaft 74 as the previously described cams 76. As the cam 147 rotates, the lower arm portions 145 move up and down, causing the upper arm portions 148 of the rigid transfer member 141 to move in and out. This in turn causes the fixed contact plate 140 to move in and out, resulting in the raising and lowering of the work carrier through the engagement of its roller 40 therewith. The rigid transfer member 141 is pivotally mounted upon the shaft 149 supported in the shaft bracket 150 in a manner similar to that previously described.

The toggle type of end transfer member 143 (Figure 26) is likewise driven by a cam 147, engaging a roller 146 mounted upon the lower arm portions 151, whereas the contact plate 144 is pivotally supported upon the ends of the upper arm portions 152. The link 153 interconnects the contact plate 144 with the projecting portion 154 of the bracket 150 through the pivotal connection provided by the pin 155 (Figure 26). In principle and in general construction, therefore, the end transfer member 143 possesses similar features to the toggle transfer member 120 previously described. In the operation thereof, the rotation of the cam 147 causes the upper arm portions 152 to move in and out in the manner previously described, carrying with them the contact plate 144 and accordingly forcing the rollers 40 up and down in an oblique direction. At the same time, the action of the link 153 upon the pivoted contact plate 144 causes the latter to be tilted around its pivot shaft 156 in such a manner as to present its face at the most efficient angle to the roller 40.

In the arrangements previously described, the work pieces 48 have been suspended from the single work carriers 38. It is frequently found more efficient to employ double rows of work pieces and to that end a double work holder is used. This is shown in Figures 20 to 26 inclusive. The work carriers 160 are of bell-crank form as previously described, and are connected to the sprocket chain 10 by similar means. The outer arms 161 of the work carriers 160, however, are provided with the pivot pins 162, upon which the T-shaped work holders 163 are pivotally mounted. The work holders 163 are also provided with extended portions 164 which are pivotally connected, as by the pins 165, to the connecting rods 166, the opposite ends of which are pivotally connected as at the pins 167 to the projections 168 of the work carriers 160. The inner arms 169 thereof carry the usual contact rollers 40. The work pieces 48 are suspended from the outer ends of the T-shaped work holders 163. In the operation of this mechanism, as the work carriers 160 are caused to rise and fall through the action of the transfer mechanism, the horizontal portions of the T-shaped work holders 163 are caused to remain horizontal through the action of the connecting rods 166. Accordingly, the work pieces 48 remain suspended in vertical positions regardless of the positions of the work carriers 160 (Figures 25 and 26). In Figure 25, the mechanism is shown in its lowered position, whereas in Figure 26, the raised position is shown.

The operation of the component parts of the apparatus of the present invention has been disclosed in connection with the description of these parts. In the operation of the apparatus as a whole, the tanks are filled with the proper solutions, the work pieces are suspended from the work carriers, the anode bars are suspended from the anode rods, and the latter are energized, together with the cathode bars. The electric motor 23 is then started, whereupon the sprocket chain 10 and the cam shaft 74 begin to move. The work carrier supports 35 are carried forward through their connection with the conveyor chain 10, causing the work carriers 38 to move along the sides of the machine with their rollers 40 engaging the guide rail portions 43. When the work carriers arrive at a partition between tanks, the roller 40 passes from the guide rail section 43 on to a contact plate 111 attached to the transfer member 95, and the latter is immediately given an impulse outward by reason of the rotation of the cam 76 which its roller 103 engages. This action causes the work carrier 38 to rise, lifting the work piece out of the tank and over the partition. As the roller 103 reaches a portion of lesser diameter, this permits the transfer member 95 to move inward, allowing the work carrier 38 to be lowered into the succeeding tank or into the unloading space of the machine. The roller 40 then rolls off the contact plate 111 and on to the next guide rail section 43.

If the transfer member is of the toggle type (Figures 7 and 8) instead of the rigid type, (Figures 3 and 4), the operation is substantially the same, except that the contact plate tilts as the transfer member moves outward and inward, so that the most favorable angle is constantly obtained between the contact roller 40 and the contact plate.

When the work carrier 38 arrives at the end of the machine, it engages the end transfer mechanism previously described. The roller 40 engages the curved contact portion 140, and this is immediately forced outward by the action of the cam 147 upon the transfer member 141, so that the work carrier arm is lifted while it passes in an arcuate path around the end of the machine. It will be obvious, therefore, that the end of the machine may contain two tanks separated by a partition substantially opposite the end, so that two immersions of the work may be made at the end of the machine by the use of this end transfer mechanism. As before, the end transfer member may have a rigid contact plate 140 (Figure 25) or a pivoted (toggle) contact plate 144 (Figure 26). In both cases, the operation of the device is substantially the same, except that with the toggle type of transfer member the roller 40 and the pivoted contact plate 144 engage one another at the most favorable angle throughout the entire working stroke.

It will be understood that I desire to comprehend within my invention such modifications as are necessary to adapt it to varying uses and conditions.

Having thus fully described my invention what I claim as new and desire to secure by Letters Patent is:

1. In an electroprocessing machine, a vertically movable work carrier, a follower member thereon, a movable transfer member having a contact portion adapted to engage said follower member, means for moving said transfer member to raise and lower said work carrier, and means for moving said contact portion relative to said transfer member during the movement of said transfer member, said last-mentioned means being arranged to maintain an angular relationship between said contact portion and said follower member which is relatively constant in comparison with the changing angle between said carrier and said transfer member during the working strokes thereof.

2. In an electroprocessing machine, a vertically movable work carrier, a follower member thereon, a pivoted transfer member having a pivoted contact portion adapted to engage said follower member, means for moving said transfer member to raise and lower said work carrier, and means connected to said contact portion and adapted to cause the same to move relatively to said transfer member into successively non-parallel positions during the motion of said transfer member, said last mentioned means being arranged to maintain an approximately constant angular relationship between said contact portion and said follower member during the motion of said transfer member.

3. In an electroprocessing machine, a vertically movable work carrier, a follower member thereon, a support, a transfer member pivotally mounted on said support, a pivoted contact portion mounted on said transfer member and arranged to engage said follower member, means for moving said transfer member to raise and lower said work carrier, a link interconnecting said support and said contact portion and adapted to cause the same to move relatively to said transfer member during the motion of said transfer member, said link being arranged to maintain an approximately constant angular relationship between said contact portion and said follower member during the motion of said transfer member.

4. In an electroprocessing machine, a vertically movable work carrier, a follower member thereon, a pivoted transfer member having a pivoted contact portion adapted to engage said follower member, means for moving said transfer member to raise and lower said work carrier, means connected to said contact portion and adapted to cause the same to move into successively non-parallel positions during the motion of said transfer member, a rotary cam support, and adjustable cam means mounted on said support adapted to engage said transfer member to move the same.

5. In an electroprocessing machine, a vertically movable work carrier, a follower member thereon, a pivoted transfer member having a pivoted contact portion adapted to engage said follower member, means for moving said transfer member to raise and lower said work carrier, means connected to said contact portion and adapted to cause the same to move into successively non-parallel positions during the motion of said transfer member, a rotary cam support, adjustable cam means mounted on said support and adapted to engage said transfer member to move the same, and releasable locking means interconnecting said cam support with said cam means.

6. In an electroprocessing machine, a vertically movable work carrier, a follower member thereon, a pivot rod, a movable transfer member on said pivot rod engaging said follower member, a shaft, and cam means on said shaft engaging said transfer member, said pivot rod being arranged at an angle to said shaft, said transfer member being arranged to move in a plane parallel to said shaft and pivoted on an axis substantially at an angle to the axis of said shaft.

7. In combination in an electroprocessing machine, a series of tanks arranged in U-shaped succession, a work carrier arranged to move over said tanks, curved guiding means arranged to guide said work carrier in its motion, means for moving said work carrier over said tanks, transfer mechanism at the curved end of said U-shaped tank series, said curved guiding means including a stationary portion and a movable portion adapted to operatively engage said transfer mechanism for raising and lowering said work carrier whereby to raise and lower the work pieces attached thereto over the partitions between said tanks, said tanks being separated from one another by a partition located in the curved portion of said U-shape adjacent said transfer mechanism.

8. In an electroprocessing machine, a chain traveling in an orbital path, a work carrier pivotally supported on said chain, said work carrier having a depending track arm, a follower on said track arm, a track comprising a stationary portion and a movable portion, a transfer member arranged to move the movable portion of the track, means for moving said transfer member to elevate said carrier arm while said carrier arm is moving bodily with the chain in an orbital path, and means for moving said movable track portion relatively to said transfer member and arranged to maintain an approximately constant angular relationship between said follower and said movable track portion.

9. In an electroprocessing machine, a chain traveling in an orbital path, a work carrier pivotally supported on said chain, said work carrier having a depending track arm, a follower on said track arm, a track comprising a stationary portion and a movable portion, a transfer member arranged to move the movable portion of the track, means for moving said transfer member to elevate said carrier arm while said carrier arm is moving bodily with the chain in an orbital path and means for moving said movable track portion relatively to said transfer member and arranged to maintain an approximately constant angular relationship between said follower and said movable track portion, said transfer member moving means including a cam synchronously operated with said chain for regulating the movement of said transfer member and the movable part of said track associated therewith.

10. In an electroprocessing machine, the combination of a chain moving in an orbital path, a work carrier arm mounted thereon to move therewith in an orbital path and pivoted to move in a vertical plane, a track a portion of which is stationary and a portion of which is movable and curved, said movable portion being aligned with the curved portion of said track, means on said arm for engaging said track, and means for moving the movable portion of the track out of alignment with the curved portion thereof whereby to move the arm in a vertical plane without stopping the movement of the arm with the chain in an orbital path.

11. In electroprocessing machine, the combination of a chain moving in an orbital path, a work carrier arm mounted thereon to move therewith in an orbital path and pivoted to move in a vertical plane, a track a portion of which is stationary and a portion of which is movable, said movable portion being curved and arranged at one end of said orbital path, means on said arm for engaging said track, means for moving the movable portion of the track away from said orbital path so as to move the arm in a vertical plane without stopping the movement of the arm and the chain in an orbital path, and curved tank means extending around one end of said orbital path and having a partition arranged adjacent said movable track portion whereby to enable transfer of the work pieces over the partition between the end compartments of the curved tank.

CONSTANTINE G. MILLER.